(12) United States Patent
Bogner et al.

(10) Patent No.: US 7,040,104 B2
(45) Date of Patent: May 9, 2006

(54) OPERATING UNIT COMPRISING AT LEAST ONE OPERATING ELEMENT FOR AN AIR CONDITIONING INSTALLATION AND/OR AN AUTOMATIC AIR CONDITIONING SYSTEM

(75) Inventors: Alexander Bogner, Ditzingen (DE); Christoph Dahm, Kernen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/473,403

(22) PCT Filed: Feb. 21, 2002

(86) PCT No.: PCT/EP02/01826

§ 371 (c)(1),
(2), (4) Date: Mar. 22, 2004

(87) PCT Pub. No.: WO02/078988

PCT Pub. Date: Oct. 10, 2002

(65) Prior Publication Data

US 2004/0154320 A1    Aug. 12, 2004

(30) Foreign Application Priority Data

Mar. 31, 2001   (DE)   ................................ 101 16 265

(51) Int. Cl.
*F25D 29/00*   (2006.01)

(52) U.S. Cl. ............................ 62/161; 62/163; 62/178; 62/186; 62/126

(58) Field of Classification Search .................. 62/126, 62/161, 178, 186, 267, 163; 236/1 C, 94
See application file for complete search history.

(56) References Cited

U.S. PATENT DOCUMENTS

| 4,951,476 A | | 8/1990 | Yamamoto et al. |
| 5,209,397 A | | 5/1993 | Arold et al. |
| 5,220,805 A | | 6/1993 | Fukudomi |
| 6,341,494 B1 | * | 1/2002 | Isobe et al. .................. 62/186 |
| 6,488,213 B1 | * | 12/2002 | Ohga et al. ................. 236/49.3 |
| 6,644,558 B1 | * | 11/2003 | Ohga et al. ................. 236/49.3 |
| 2003/0066297 A1 | * | 4/2003 | Ichishi et al. ................. 62/161 |

FOREIGN PATENT DOCUMENTS

| DE | 4443026 A1 | 6/1996 |
| EP | 0814965 B1 | 10/1999 |

* cited by examiner

*Primary Examiner*—Marc Norman
(74) *Attorney, Agent, or Firm*—Crowell & Moring LLP

(57) ABSTRACT

The invention relates to an operating unit comprising at least one operating element, especially for adjusting the quantity of air, the temperature or the air distribution of an automatic air conditioning system, an automatic function and a manual adjustment function being provided. According to the invention, when changing from the automatic function to the manual adjustment function, the adjusted valued of the adjustment function is associated with the value of the automatic function which is selected during the changeover, or the next value in the direction of the new target value, or the closed value to the display value, or a value which can be pre-programmed in a fixed manner.

16 Claims, 1 Drawing Sheet

OPERATING UNIT COMPRISING AT LEAST ONE OPERATING ELEMENT FOR AN AIR CONDITIONING INSTALLATION AND/OR AN AUTOMATIC AIR CONDITIONING SYSTEM

CROSS-REFERENCE TO RELATED APPLICATIONS

This application claims the priority of German application 101 16 265.0, filed Mar. 31, 2001, which was filed as International Application No. PCT/EP02/01826, on Feb. 21, 2002, the disclosure of which is expressly incorporated by reference herein.

FIELD OF THE INVENTION

The invention relates to an operator control unit having at least one operator control element for an air-conditioning system and/or automatic air-conditioning system, in particular for setting the air quantity or the temperature or the air distribution of an automatic air-conditioning system according to the features described herein.

BACKGROUND OF THE INVENTION

A generic operator control unit having at least one operator control element is described, for example, in EP 0 814 965 B1. An operator control device is disclosed which has an automatic and a manual setting operating mode, in each case a manually adjustable analog setpoint-value setting device, which permits simple manual setting maneuvers, being provided as setpoint-value setting means for "air distribution" and/or the "air quantity" and/or the "air temperature". In each case a manually adjustable analog setpoint-value setting device, which permits simple manual setting maneuvers, is provided as well as display means for "air distribution" and/or "air quantity" and/or "air temperature". In each case an analog display device is assigned as display means for "air distribution" and/or the "air quantity" and/or the "air temperature" in each analog setpoint-value setting device, which display device is greatly adjusted, as a setpoint-value display device, in analog fashion in the manual setting mode by means of an independent extraneous drive so as to correspond to the setpoint value which is set, ensuring unambiguous and quick reading of the value which is set. Upon changeover into the automatic setting mode by activating an automatic key, the independent extraneous drive automatically adjusts the display device, as an actual-value display device, directly in analog fashion so as to correspond to the respective actual value for "air distribution" and/or "air quantity", as a result of which the display means which is previously used as a setpoint-value display during manual adjustment can also be used as an actual-value display in the automatic operating mode. A rotary knob is in each case provided as setpoint-value setting device, said rotary knob being assigned in each case a scale display for the setpoint-value display means or actual-value display means in a concentric fashion at least over part of the circumference. The automatic function of the automatic air-conditioning system has a switch-off dependence on the manual activation of the setpoint-value setting means in the form of the rotary knobs. If the device is switched over back to automatic operating mode by activating the automatic switch-on means, in particular in the form of the push button switch, the automatic system controls the corresponding values in accordance with its program which is input into it. The display cursors move onto the new automatic-specific values and display, as actual-value display device, the respective value which is set by the automatic system.

With these types of operator control elements, it is disadvantageous that, when switching over from the automatic function to the manual setting function, the value which is set at the operator control element does not correspond to the currently active value so that, if the automatic function has implementeed a blower level of 3, and the value which has been set is at a blower level of 1, and the operator then moves the blower actuating wheel to the right from 1 to 2 in order to increase the blower power, the blower is however reduced as the blower power which has been set from the automatic operating mode was the level 3. The problem is also experienced with the operator control elements for temperature and air distribution.

SUMMARY OF THE INVENTION

The object of the invention is to further develop an operator control element for an automatic air-conditioning system with a manual setting function in such a way that the operating convenience of the air-conditioning system is improved.

The object is achieved by virtue of the fact that, when switching over from the automatic function into the manual setting function, the setting function value which is set corresponds to the value of the automatic function which is selected during the switching over.

With this type of operator control element it is advantageous that display means are provided which, in the manual operating mode, display the value which has been currently set and that the value which is set at the operator control element corresponds to the value which is actually implemented. When the operator control element is set to a boosting direction, the blower is then increased although the value which is set had been assigned to a lower blower level before the device was switched over into the automatic function. By switching over from the automatic function into the manual setting function, the value of the air-conditioning system which is currently actually implemented during the switching over process is assigned to the value which is set at the control element. If the operator control element is used to set the blower level, the blower level which is currently actually implemented by the automatic function during the switching over is assigned to the value which is set at the operator control element or to the next value in the direction of the new target value or to the value which is possible at the closest display value or to a permanently preprogrammed value. This blower level is displayed using display means so that, in the manual setting function, the operator knows which blower level is currently set. By adjusting the operator control element in the booster direction, the blower is increased, which is displayed with the display means. The behavior is analogous when there is an adjustment in the reduction direction. The blower level is then reduced, which is also displayed in this case by the display means.

DETAILED DESCRIPTION OF THE INVENTION

Figure 1:
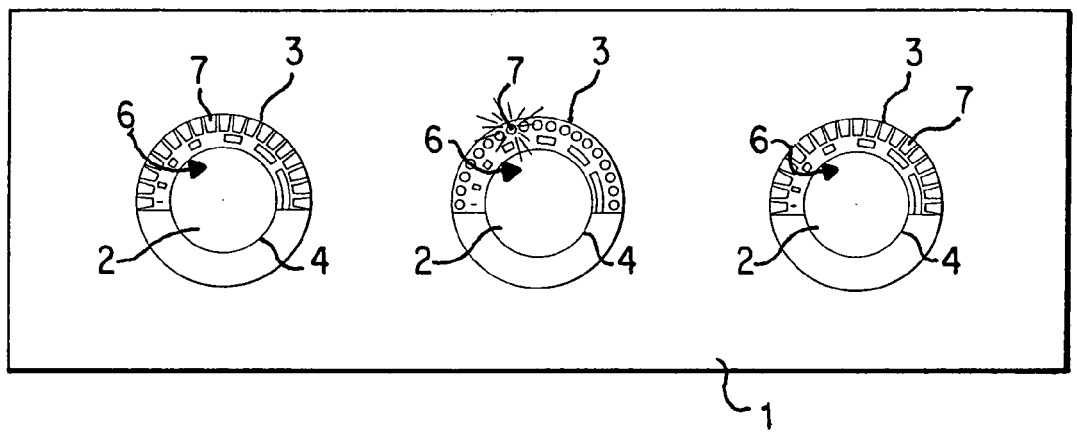
FIG. 1 shows an operator control element with an automatic function and a manual setting function.

FIG. 1 shows an operator control unit 1 for an automatic air-conditioning system with three operator control elements 3, each operator control element 3 being equipped with an automatic function 2 and a manual setting function 4. The operator control element 3 can be provided for changing the air quantity, the air distribution or the temperature. An operator control unit 1 for an automatic air-conditioning system usually has a plurality of operator control elements 3, one operator control element 3 being provided for the temperature, one operator control element 3 being provided for the air quantity and one operator control element 3 being provided for air distribution. By pressing the central knob, the automatic function 2 is activated and the function which can be set by means of the operator control element 3 is automatically set as a function of predefined parameters. The value 6 which is set at the operator control element 3 is ignored until the automatic function 2 is deactivated and the manual setting function 4 is activated again. The value 6 which is set at the operator control element 3 is assigned, when switching over from the automatic function 2 into the manual setting function 4, to the value which is actually implemented by the automatic function 2 or to the closest value in the direction of the new target value or to the value which is possible at the closest display value or to a permanently preprogrammed value. If the operator control element 3 is used to set the blower level, when switching over from the automatic function 2 into the manual setting function 4, the blower level which is actually implemented by the automatic function 2 is assigned to the value 6 which is set at the operator control element 3. Display means 7 which display the current value in the manual setting function 4 are arranged around the operator control element 3. The display means show, in the manual setting function, the value which is set and/or assigned by the air-conditioning system. The display means are composed of a light chain which is arranged around the operator control element, in particular an LED chain, which are arranged in order to display the position of the value which has been set by the air-conditioning system in the manual operating mode. When switching over occurs, they consequently display the value which the automatic function 2 has actually implemented at the time of the switching over. In the manual setting function 4, this value then remains set until an adjustment occurs at the operator control element 3.

Figure 2:
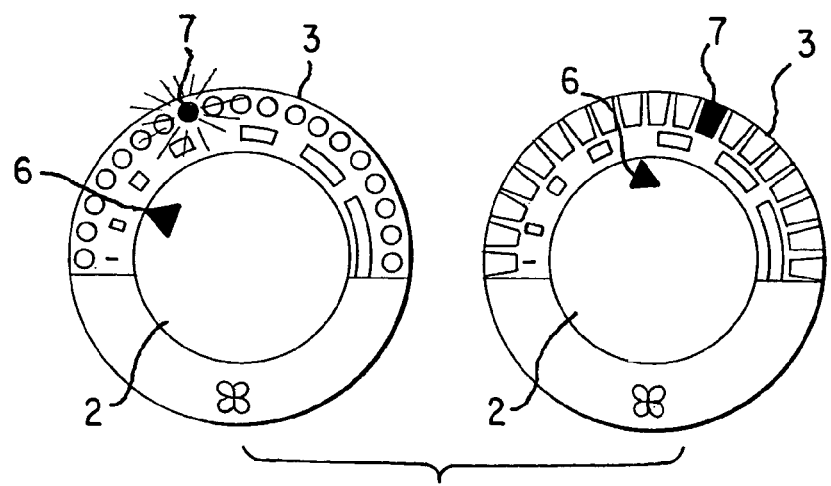
FIG. 2 shows two operator control elements.

FIG. 2 shows two operator control elements 3, a value being set at the operator control element. The operator control element for the manual operator control function is embodied as an infinite rotary wheel. In the left-hand image, the display means shows the value which is actually implemented by the air-conditioning system, during the switching over from the automatic function into the manual setting function. The value which is actually implemented is displayed during the switching over. The value which is set is then assigned to this value which is actually implemented. The right-hand image then shows the operator control unit with the operator control element after the operator control element has been adjusted during a manual setting function of the air-conditioning system. The value which is set was moved in the boosting direction. The display function displays the new values which was set by the air-conditioning system by this operator control intervention. If the operator control element which is shown is used to set the blower level, a blower level of 3 is displayed in the display means in the left-hand part of the figure. The value which is set is still at the same location as before the automatic function was switched over. However, it is now no longer equal to the value of the blower level 2 which was actually implemented then but is now assigned to the value of the blower level 3 which is actually implemented by the automatic function although no change has taken place at the operator control element. This change is however visible by virtue of the display means 7 which display, in the manual setting function 4, the value which is actually implemented by the air-conditioning system so that the operator always knows which blower level is actually implemented at that moment, and in which direction the operator control element 3 has to be moved in order to reduce or increase the value which is actually implemented. When the operator control element 3 is adjusted in the boosting direction, the blower level is increased from 3 to 4 or 5, depending on the setting. When the operator control element 3 is adjusted in the reduction direction, the blower level is decreased from 3 to 2 or 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An operator control unit comprising:
   at least one operator control element for setting the quantity of air or the air temperature or air distribution of an air-conditioning system with an automatic function and a manual setting function;
   wherein, when switching from the automatic function into the manual setting function, a set value of the manual setting function is assigned to a value of the automatic function which is selected during the switching over, or to a closest value in a direction of a new target value or to a value which is possible at a closest display value.

2. The operator control unit of claim 1, wherein display means are provided which, during the manual setting function, display the value which is actually implemented and/or assigned by the air-conditioning system.

3. The operator control unit of claim 1, wherein display means are composed of a light chain, in particular a LED chain, which is arranged around the operator control element, for displaying the position of the value which is set and/or assigned by the air-conditioning system during manual operation.

4. The operator control unit of claim 1, wherein the operator control element for the manual setting function is configured as an infrared rotary wheel.

5. An operator control unit comprising:
   at least one operator control element for setting the quantity of air or the temperature or air distribution of an air-conditioning system with an automatic function and a manual setting function being provided;
   wherein, when switching from the automatic function into the manual setting function, a set value of the manual setting function is assigned to a value of the automatic function which is selected during the switching-over, or to a closest value in a direction of a new target value or to a value which is possible at a closest display value or to a permanently preprogrammed value.

6. An operator control unit comprising:
   at least one operator control element of an air-conditioning system having an automatic function and a manual setting function;

wherein, when switching from said automatic function to said manual setting function, a set value of said manual setting function is assigned to one of a plurality of values.

7. The operator control unit of claim 6, wherein one of said at least one operator control element sets a quantity of air.

8. The operator control unit of claim 6, wherein one of said at least one operator control element sets an air temperature.

9. The operator control unit of claim 6, wherein one of said at least one operator control element sets an air distribution.

10. The operator control unit of claim 6, wherein one of said at least one operator control element sets one of a quantity of air, an air temperature, and an air distribution.

11. The operator control unit of claim 10, wherein said one of a plurality of values is one of a value of said automatic function selected during said switching, a closest value in a direction of a new target value, and a value which is possible at a closest display value.

12. The operator control unit of claim 11, wherein a display shows, during said manual function, a value actually implemented and/or assigned by said air-conditioning system.

13. The operator control unit of claim 12, wherein said display includes a light chain arranged around said one of at least one operator control element for displaying said value actually implemented and/or assigned by said air-conditioning system.

14. The operator control unit of claim 13, wherein said light chain is an LED chain.

15. The operator control unit of claim 14, wherein said one of at least one operator control element for said manual setting function is configured as an infrared rotary wheel.

16. The operator control unit of claim 13, wherein said one of at least one operator control element for said manual setting function is configured as an infrared rotary wheel.

* * * * *